United States Patent [19]

Schonenberg et al.

[11] Patent Number: 5,689,102
[45] Date of Patent: Nov. 18, 1997

[54] PORTABLE MULTI-DIRECTIONAL BAR CODE SCANNER

[75] Inventors: Cornelis Reinier Johannes Schonenberg, Hoofddorp; Laurentius Wilhelmus Nunnink, Deventer, both of Netherlands

[73] Assignee: Scantech B.V., Netherlands

[21] Appl. No.: 514,031

[22] Filed: Aug. 11, 1995

[30] Foreign Application Priority Data

Aug. 11, 1994 [NL] Netherlands ............ 9401302

[51] Int. Cl.$^6$ .................................. G06K 7/10
[52] U.S. Cl. ........................... 235/467; 235/462
[58] Field of Search ............... 235/467, 462, 235/472, 454

[56] References Cited

U.S. PATENT DOCUMENTS

| | | | |
|---|---|---|---|
| 4,795,224 | 1/1989 | Goto | 359/211 |
| 4,797,551 | 1/1989 | Ferrante | 250/234 |
| 4,799,164 | 1/1989 | Hellekson et al. | 235/467 |
| 5,064,258 | 11/1991 | Inokuchi et al. | 359/17 |
| 5,073,702 | 12/1991 | Schuhmacher | 235/467 |
| 5,115,333 | 5/1992 | Mergenthaler et al. | 359/196 |
| 5,206,491 | 4/1993 | Katoh et al. | 235/467 |
| 5,216,232 | 6/1993 | Knowles et al. | 235/467 |
| 5,475,207 | 12/1995 | Bobba et al. | 235/467 |
| 5,557,093 | 9/1996 | Knowles et al. | 235/462 |

FOREIGN PATENT DOCUMENTS

| | | | |
|---|---|---|---|
| 0 224 996 | 6/1987 | European Pat. Off. | |
| 2 309 933 | 11/1976 | France | |
| WOA89/ 05013 | 6/1989 | WIPO | |

OTHER PUBLICATIONS

IBM Technical Disclosure Bulletin, vol. 23, No. 8, Jan. 1981, Bar Code Scanner Lens Aperature, W.M. Routt, Jr.

*Primary Examiner*—Donald T. Hajec
*Assistant Examiner*—Karl Frech
*Attorney, Agent, or Firm*—Bell, Boyd & Lloyd

[57] ABSTRACT

An apparatus for scanning bar code on an article is disclosed. The scanner has a housing provided with a window; a laser light source for transmitting a laser beam which is disposed in the housing; a first mirror fixedly disposed in the housing for reflecting the laser light beam; a member mounted in the housing for rotatable driving and provided with second rotatable mirror; and a detector for receiving the laser light coming from the bar code reflected by the fixed mirror and the rotatable mirror and admitted via the window. The fixed and rotatable mirrors are disposed such that a pattern of a comparatively large number of relatively short scan lines partly overlapping each other is created as seen on the window. The scan lines first converge relative to each other to an area on a predetermined distance from the window and the scanlines diverge from each other beyond the area in the direction away from the window, so that the area, for instance on a distance 0–30 cm from the window, is traversed at different angles in each case by the scan lines.

14 Claims, 5 Drawing Sheets

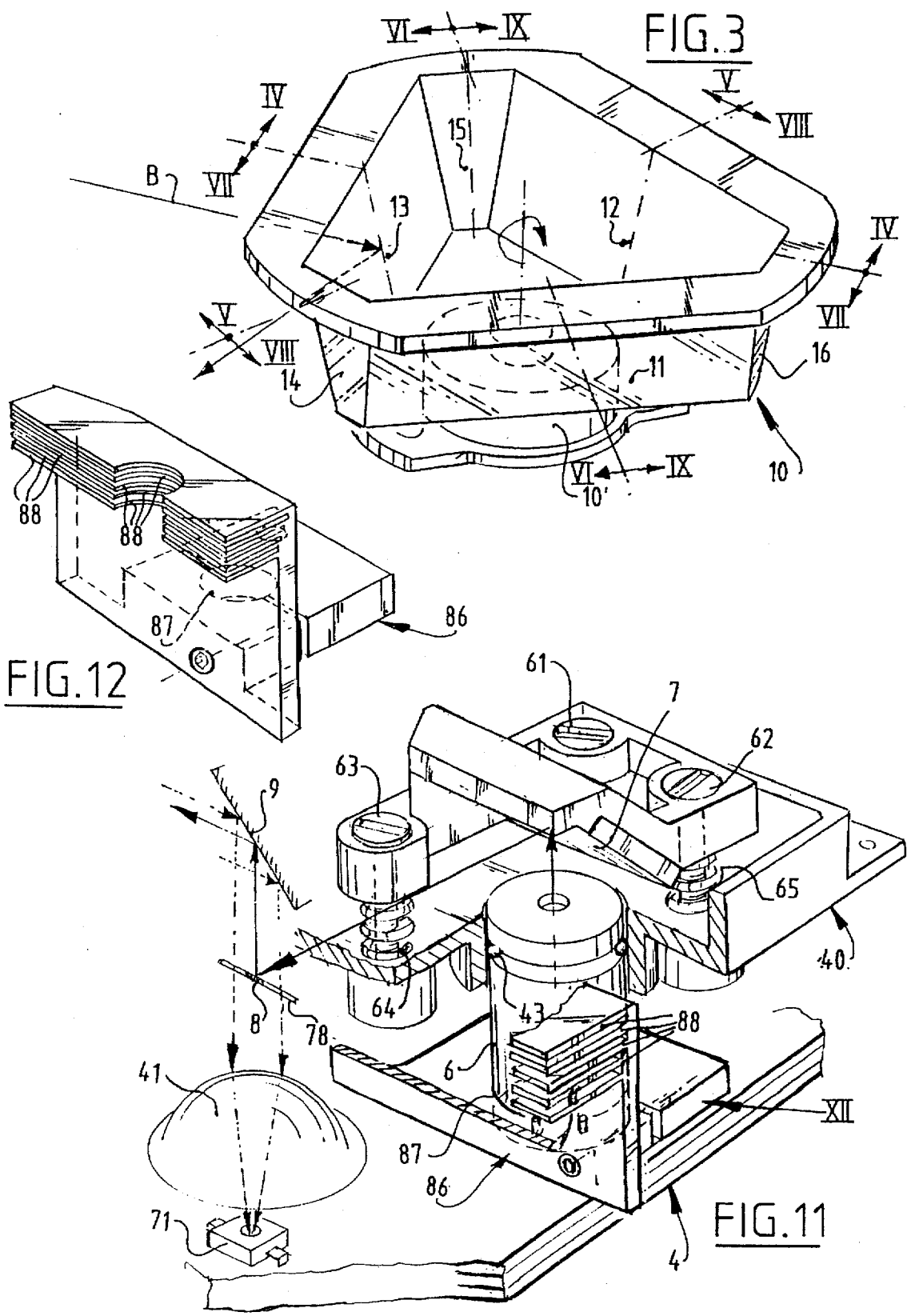

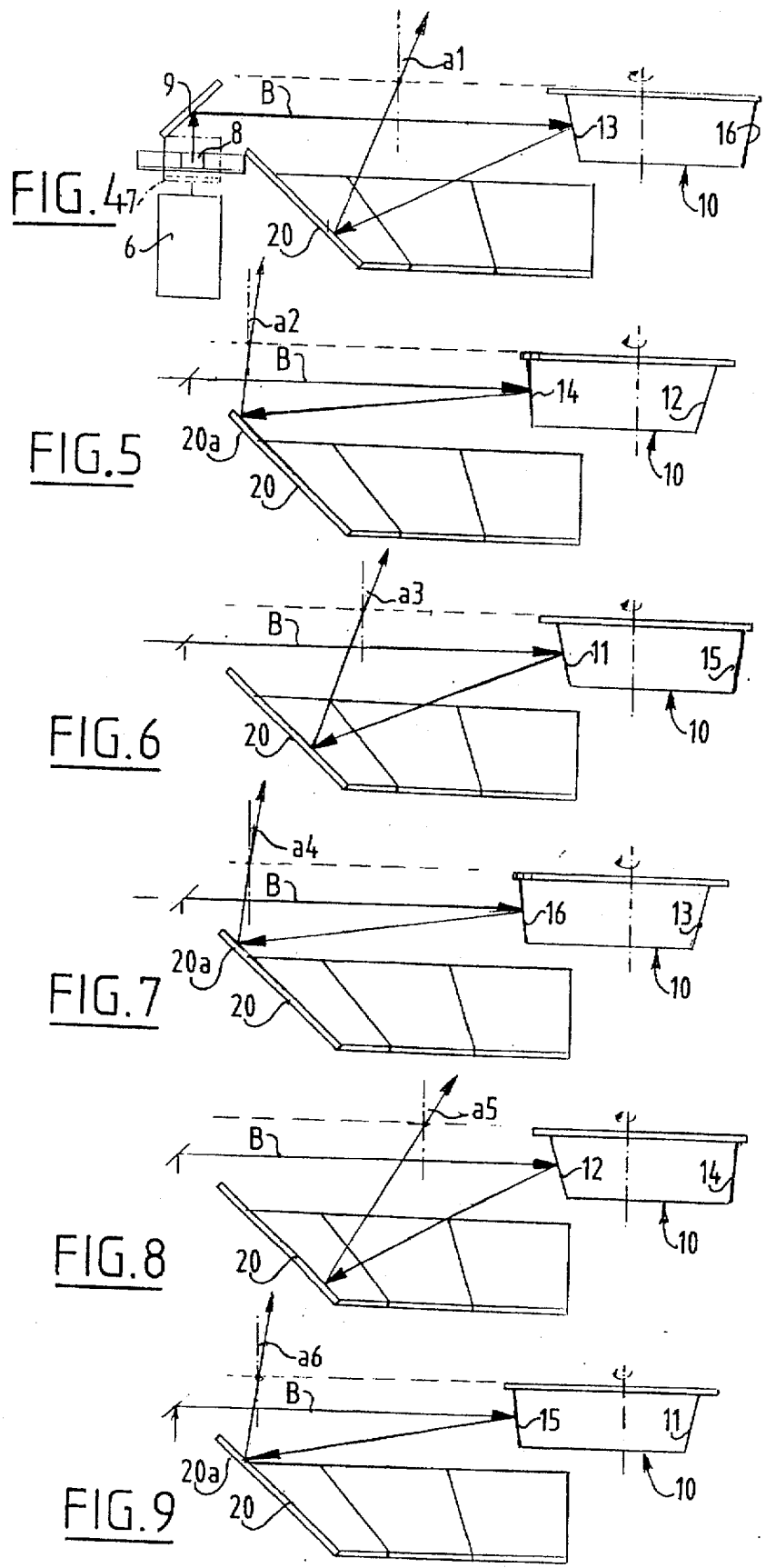

PORTABLE MULTI-DIRECTIONAL BAR CODE SCANNER

FIELD OF THE INVENTION

The present invention relates to a bar code scanner.

BACKGROUND OF THE INVENTION

Apparatus for scanning a bar code, or bar code scanners, are being used on increasingly larger scale in Western Europe and the United States in supermarkets and the like. These are usually scanners disposed in a fixed horizontal or vertical position along which an article purchased by the customer must be moved. Such known scanners are usually built in, which is time-consuming and cost-intensive. These bar code scanners also have the defect that particular articles often have to be moved repeatedly past a window thereof due to an insufficiently accurate operation. This frequently results in damage to this window.

Such a known scanner is disclosed in European patent application EPA 0224996 which has the above disadvantages inherently related with the built in scanner.

Such a built-in scanner is also disclosed in WO 89/05013 which discloses a scanner apparatus having twelve fixed mirror for obtaining pairs of parallel lines in six scanning directions. This arrangement is bulky and is only suited for mounting in a check out counter.

SUMMARY OF THE INVENTION

It is an object of the present invention to provide a precisely operating and compact apparatus so that scanning of the bar code on an article takes place easily, for instance during movement thereof substantially in the direction of the laser beans through the window and not necessarily in a direction perpendicular thereto, i.e. along the window. Further aspects of the present invention relate to the few components required, such as only a single board with electrical circuits on which the laser source is also arranged, and the space in which a limited number of mirrors is disposed and which are easily embodied in a dust-free form.

The present invention provides an apparatus for scanning bar code on an article, comprising:

a housing provided with a window;

a laser light source for transmitting a laser beam which is disposed in the housing;

a first mirror fixedly disposed in the housing for reflecting the laser light beam;

a rotating driving member mounted in the housing provided with a second rotatable mirror; and a detector for receiving the laser light coming from the bar code reflected by the fixed mirror and the rotatable mirror and admitted via the window, wherein the fixed and rotatable mirror means are disposed such that a pattern of a comparatively large number of relatively short scan lines partly overlapping each other is created as seen on the window and wherein the scan lines first converge relative to each other to an area on a predetermined distance from the window and wherein the scanlines diverge from each other beyond said area in the direction away form the window, so that said area, for instance on a distance of 0-30 cm, from the window, is traversed at different angles in each case by the scan lines.

The apparatus according to the present invention will usually be installed in an upright position. When an article is moved towards the window the bar code is likely to pass a number of the scanning lines improving the chance that the bar code is recognized. The apparatus according to the present invention has proven to be very adept in recognizing bar codes, even bar codes consisting of a relatively short height bar code (truncated bar codes). The chance of recognition is substantially independent of the direction (Omnidirectional), as the scan lines diverge and converge in the direction in which the article is moved. towards the window. The scan lines form a "sweet spot" on a predetermined distance of the window, where the density of the scan lines is very high.

The apparatus according to the present invention is particularly suitable for applications where little space is available to move articles with a bar code. The apparatus according to the present invention can be placed standing upright on a surface and the bar code on objects can be read by moving the objects toward and away from the window at a distance therefrom without contact with this window being necessary, thus preventing damage to this window.

Since it has been found in practice that the objects are usually moved towards the window in a direction wherein the bars of the bar code extend parallel to one of the sides of the window, the scanning pattern preferably comprises one or more lines parallel to a first side of this window in addition to one or more lines parallel to a second side of this window, i.e. perpendicular of the first direction.

French patent application FR-A-2309933 also discloses a built in scanning apparatus, having a rotating polygon mirror with five mirror surfaces.

According to another aspect of the present invention an apparatus for scanning bar codes on an article is provided, comprising;

a housing provided with a window;

a laser light source for transmitting a laser beam which is disposed in the housing;

a first mirror fixedly disposed in the housing for reflecting the laser light beam;

a rotating driver member mounted in the housing provided with a second rotatable mirror; and a detector for receiving the laser light coming from the bar code reflected by the fixed mirror means and the rotatable mirror means and admitted via the window, wherein the rotatable member comprises three relatively large mirror surfaces and three relatively small mirror surfaces.

By the three relatively small mirror surfaces three additional lines are provided in a scanning direction for which it is most likely that the bar code will be shown to the apparatus.

According to another aspect of the present invention an apparatus for scanning bar code on an article is provided, comprising:

a housing provided with a window;

a laser light source for transmitting a laser beam which is disposed in the housing;

a first mirror fixedly disposed in the housing for reflecting the laser light beam;

a rotating driver member mounted in the housing provided with second rotatable mirror means; and a detector for receiving the laser light coming from the bar code reflected by the fixed mirror means and the rotatable mirror means and admitted via the window, wherein the mirror surfaces on the rotatable member are vapor-deposited mirrors.

The vapor-deposited mirror provide for a very light weight rotating mirrors, e.g. 3 g, which provides for the possibility of a very high rotating speed, e.g. 6000 rpm. A further advantage of the vapor-deposited mirrors relative to using adhesive, is that no imbalance will occur in the rotating mirror, due to the fact that no different amount of adhesive will be used for mounting each mirror. No compensation for such imbalance is required when assembling the rotating mirrors.

Yet another aspect of the present invention relates to preventing identification of inaccuracies or stains on the bar code. Therefore the present invention provides an apparatus for scanning bar code on an article, comprising;

a housing provided with a window;

a laser light source for transmitting a laser beam which is disposed in the housing;

a first mirror fixedly disposed in the housing for reflecting the laser light beam;

a rotating driving member mounted in the housing provided with a second mirror means; and a detector for receiving the laser light coming from the bar code reflected by the fixed mirror and the rotatable mirror and admitted via the window. The apparatus is provided with a cylindrical lens for making oval the laser light spot or cross section of the laser beam before the laser beam is transmitted through the window.

The present invention further provides a bar code scanner provided with a lens for focussing the reflected laser beams to the detector which is manufactured from injection molded plastic.

Further advantages, features and details of the present invention will be elucidated in the light of the following description of a preferred embodiment thereof, wherein reference is made to the annexed drawing, in which:

FIG. 3 shows a view in perspective of detail III of FIG. 2;

FIG. 4 is a schematic view of the operation of the apparatus of FIGS. 1 and 2 on a first position;

FIG. 5 is a schematic view of the operation of the apparatus of FIGS. 1 and 2 in a second position;

FIG. 6 shows a schematic view of the operation of the apparatus of FIGS. 1 and 2 in a third position;

FIG. 7 shows a schematic view of the operation of the apparatus of FIGS. 1 and 2 in a fourth position;

FIG. 8 shows a schematic view of the operation of the apparatus of FIGS. 1 and 2 in a fifth position;

FIG. 9 is a schematic view of the operation of the apparatus of FIGS. 1 and 2 in a sixth position;

FIG. 11 is a partly broken away view in perspective of detail XI in FIG. 2;

FIG. 12 shows a view in perspective of detail XII in FIG. 11; and

The preferred embodiment of a bar code scanner 1 (FIG. 1, 2) or an apparatus for scanning bar codes comprises a housing 2 in which is incorporated a window 3 through which the laser beams can exit to the outside and can impinge on a bar code B of an object O and after reflection thereagainst can be detected in a detector via that window.

Figure 1:
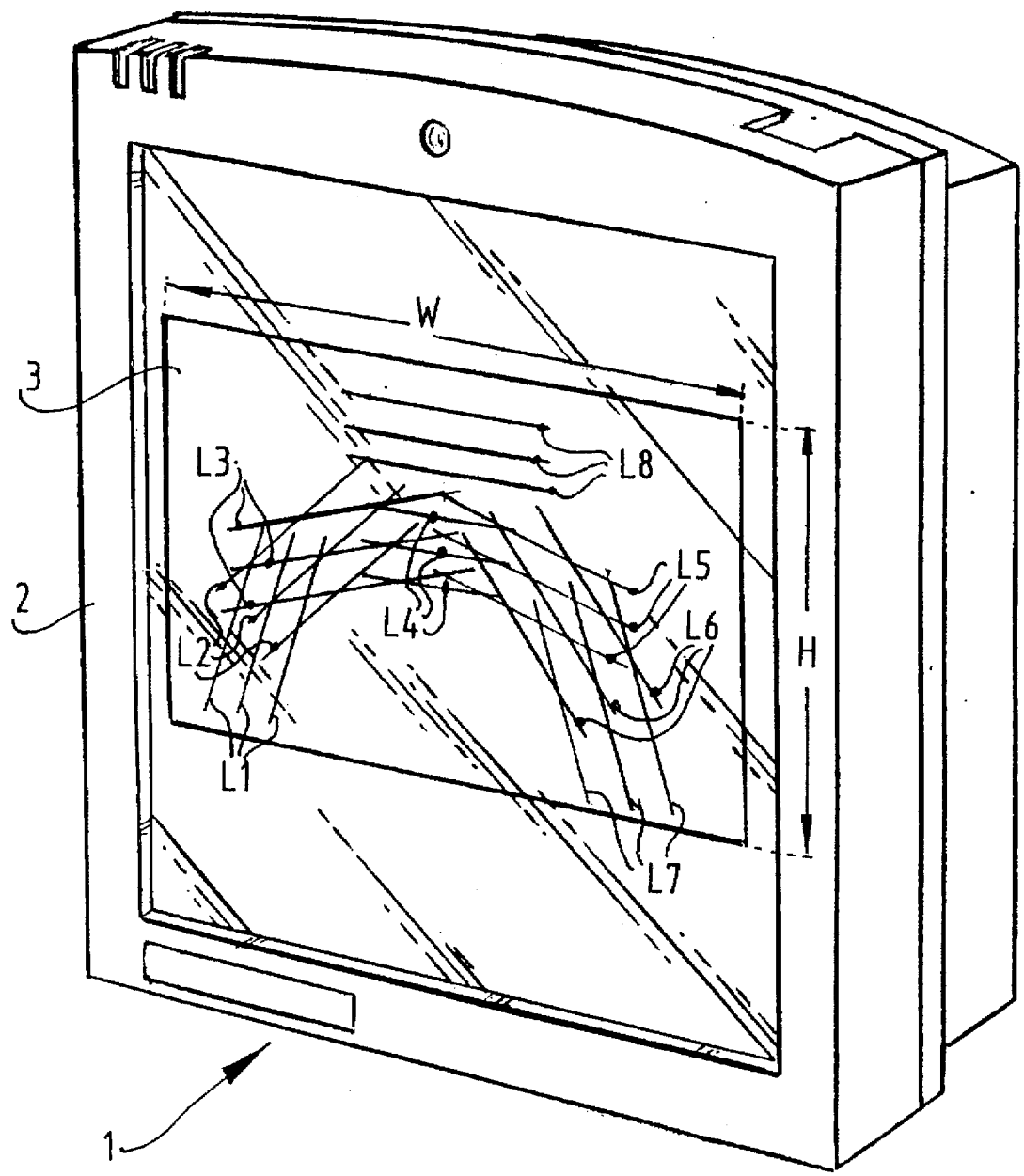
FIG. 1 shows a view in perspective of a preferred embodiment of a bar code scanner according to the present invention.

As is apparent from FIG. 1, a pattern of preferably three parallel lines in each case $L_1$, $L_2$, $L_3$, $L_4$, $L_5$, $L_6$, $L_7$ respectively L8 is generated by the apparatus, which lines traverse a large part of the window since in the present case these lines extend at seven different angles relative to a side of the window, while they have a relatively short length, whereby the apparatus can remain compact in terms of internal structure. The lines have a length for instance of less than half the height W or width W of the window. The scan lines form on the window approximately a reverse U built up of seven groups of three parallel straight lines above which extend a further three parallel straight lines. As practice has taught that objects are usually moved with the bars of the bar code parallel to one of the sides toward and away therefrom, the directions $L_1$ and $L_7$ extend roughly parallel to the first side, while lines $L_4$ and $L_8$ extend parallel to the other side of the window. Due to these directions $L_1$ and $L_7$ on one side and $L_4$ and $L_8$ on the other, each consisting of three scan lines, a tube-like area is created in front of the window which is intersected by the scan lines of the directions $L_2$, $L_3$, $L_5$ and $L_6$ which diverge slightly relative to these principal directions defining the tube-like area.

It will be apparent that the scan lines have the pattern shown in FIG. 1 only on the window 3, as the lines will extend otherwise relative to each other in planes on a certain distance from the window.

Figure 2:
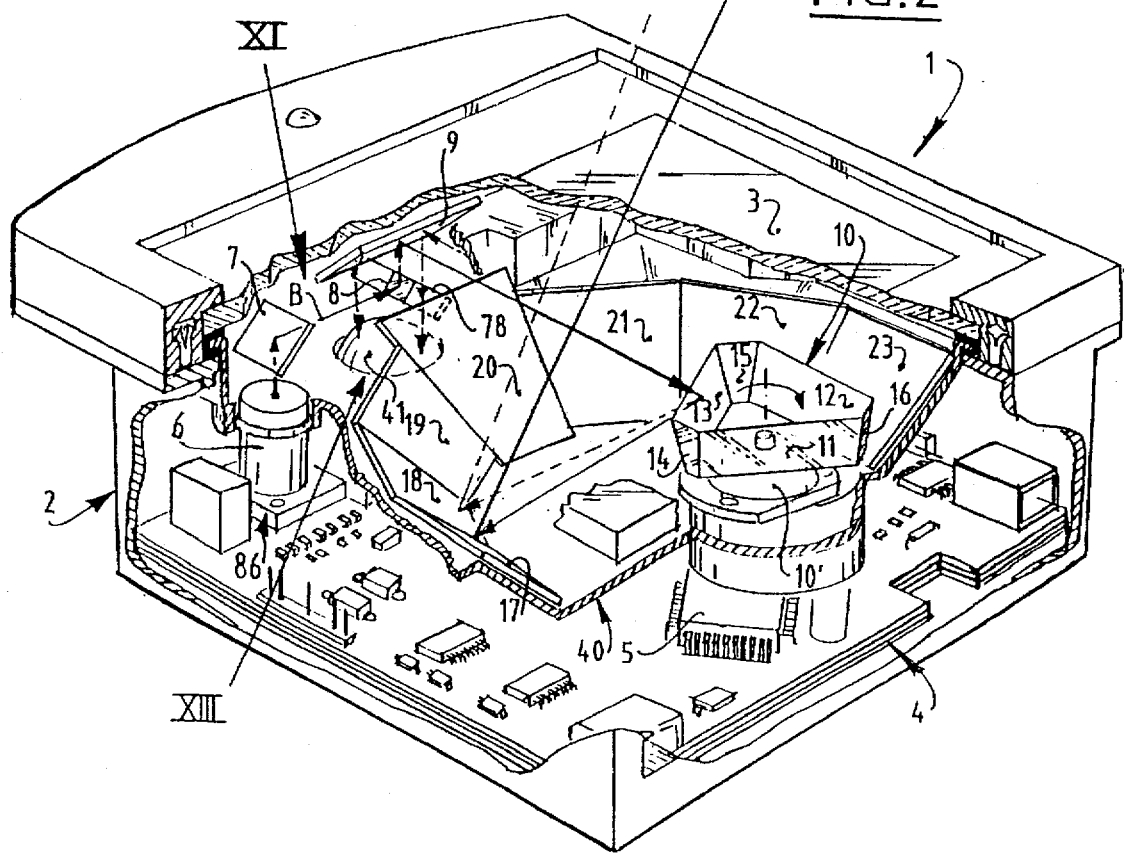
FIG. 2 shows a partly broken away view in perspective of the apparatus of FIG. 1.

This is shown for instance in FIG. 2 where the pattern P is shown at a distance from the window, wherein this pattern P presents a view differing clearly from that shown in FIG. 1. Accommodated in housing 2 is a single multi-layer board 4 on which are arranged diverse electronic components including a processor (ASIC) 5 for processing the bar code information in addition to a laser light source 6 which via fixedly disposed mirrors 7, 8 and 9 generates a beam B to a rotating member 10 which is rotated at high rotation speed by a motor 10' and on which three comparatively large mirror surfaces 11, 12 and 13 as well as three comparatively small mirror surfaces 14, 15 and 16 are vapor deposited. From the rotating member 10 the laser beam B is projected outside as scan lines in the pattern P via fixedly disposed mirrors 17, 18, 19, 20, 21, 22 and 23 and via window 3. A line $L_2$ for instance of the pattern P is shown in the figures by means of the full arrow line and the broken arrow line.

In a manner not shown a cylindrical lens is preferably arranged close to the (semiconductor) laser light source for making oval the cross section of the laser light beam B, for instance to an extent such that the largest diameter of the "spot" is twice as large as the smallest diameter thereof in a direction perpendicularly of the scan lines, whereby a bar of the bar code, i.e. a black or white strip thereof, impinged upon by a scan line reflects in each case a comparatively large quantity of laser light of the beam B, which it has been found greatly enhances the accuracy of the scanning. Inaccuracies or stains on the bar code, such as a hair, will thus not be identified as a bar thereof.

In the shown preferred embodiment of the apparatus according to the present embodiment the laser light source 6 is placed in a holder 86 (see also FIGS. 11 and 12) which is provided with an aperture 87 in which the laser light source 6 is placed and with cooling fins 88 for spreading the heat dissipated by the laser light source 6.

The motor 10' is preferably a three-phase electric motor wherein the shaft of the rotating member 10 is driven by two solenoids at a time, while from the third solenoid a pulse can be derived which serves as counting pulse for counting the rotation speed of the electric motor. When the rotation speed falls to an undesired level the laser light source must be switched off automatically. This switch-off of the laser light source is of importance for the safety of the user as an excessive intensity thereof can result for instance in damage to the eye.

Shown schematically in FIGS. 4–9 is the manner in which the laser beam B coming from the laser source 6 passes over the various mirrors on the rotatable member 10. As also shown in FIG. 2, the fixedly disposed mirror 20 under the fixedly disposed mirror 9 and directly opposite the rotatable member is slightly larger than the adjacent mirrors 17, 18, 19 respectively 21, 22 and 23. When passing over a first relatively large mirror, for instance 13 (see also FIG. 3), on the rotatable member 10 the laser beam exits at a first angle a1. The laser beam is then reflected against the relatively small mirror 5 which reflects the laser beam against the protruding portion 20a of mirror 20, whereby the laser bean exits at an angle a2. With reflection against a mirror 11 an exit at an angle a3 is then obtained, while against the relatively small mirror 16 an exit at an angle a4 is obtained. The angles a5 and a6 are associated with the respective mirrors 12 and 15 on rotatable member 10. The different angles of exit can be seen on the window 3 in FIG. 1 as the six lines $L_8$ and $L_4$ which extend mutually parallel on this window.

On account of the different angles relative to the vertical of each of the mirrors 11, 12 and 13 three lines are in each case projected outside through the window by each of the fixedly disposed mirrors 17, 18, 19 and 21, 22 and 23, which lines extend parallel for each mirror on the window 3 (see FIG. 1 the line beams $L_1$, $L_2$, $L_3$, $L_5$, $L_6$ and $L_7$).

Figure 13:
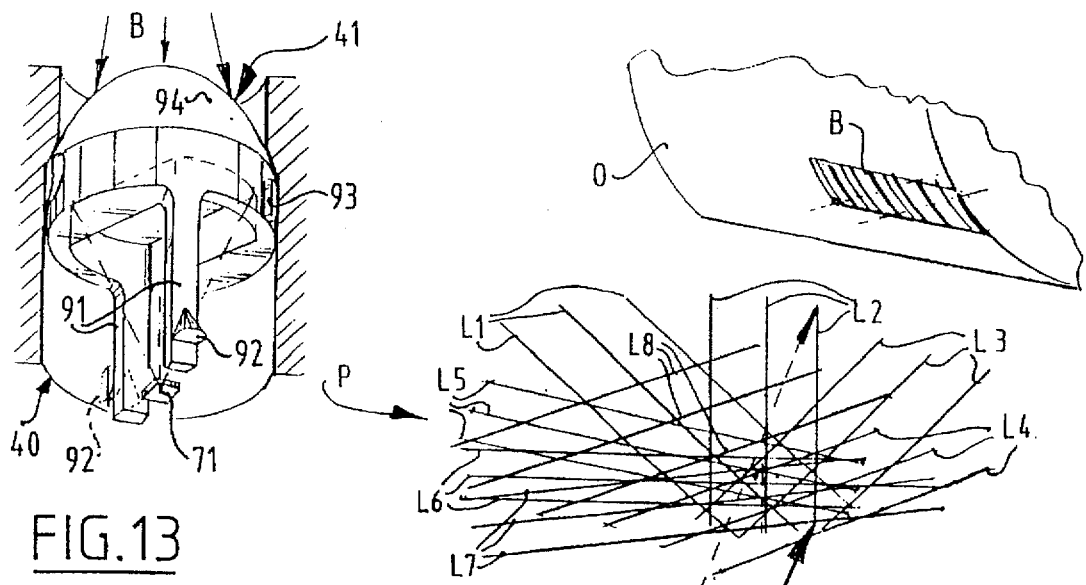
FIG. 13 shows a view partly in perspective and partly in section of detail XIII in FIG. 2.
Figure 10:
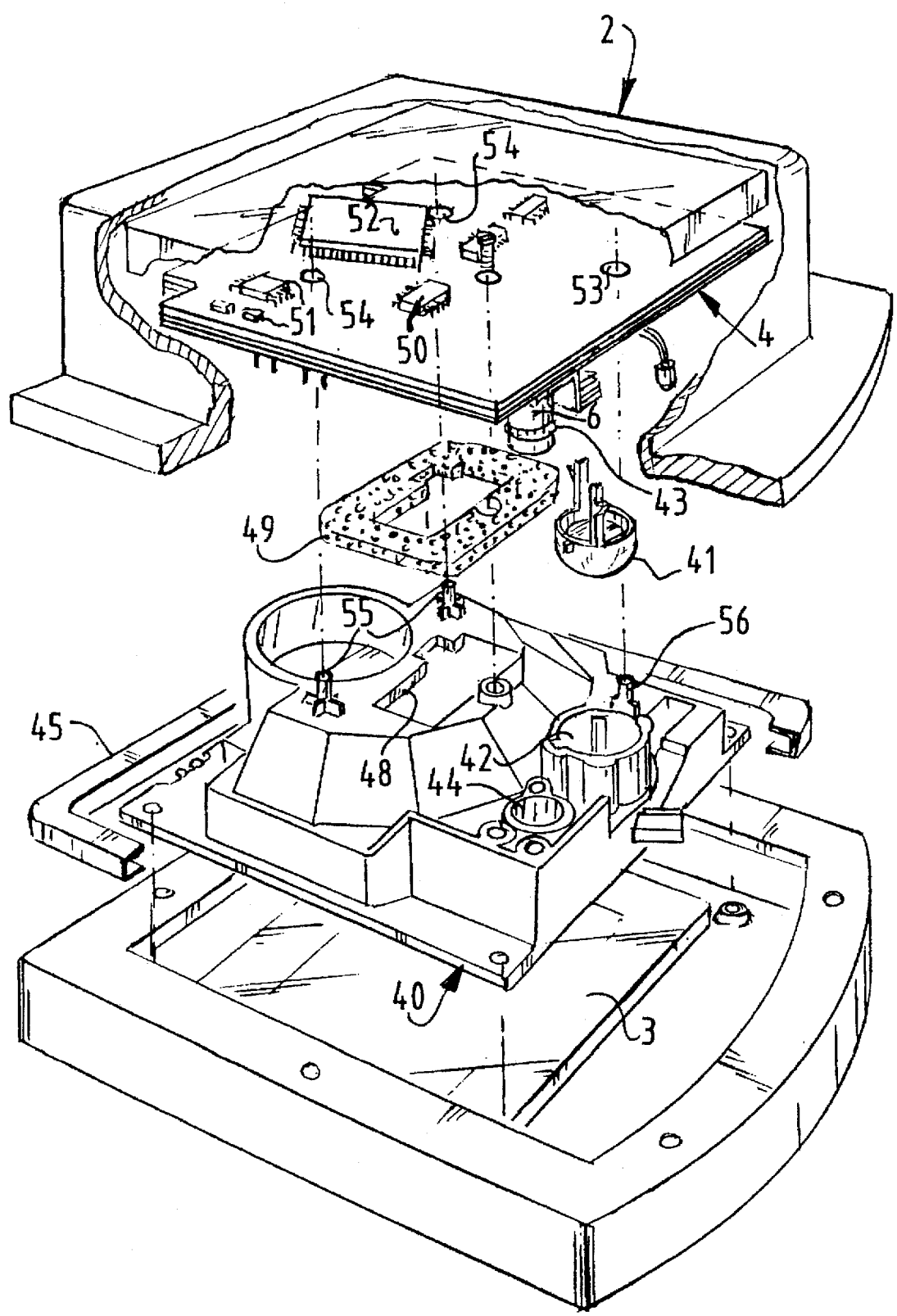
FIG. 10 is a disassembled bottom view of the apparatus of FIGS. 1 and 2.

In FIG. 10 it can be seen that the space behind window 3 is bounded by a component 40 which is preferably a single injection molded component in which the other components can be assembled in simple manner. A lens 40, which is placed in front of a detector (not shown in FIG. 10) and is preferably molded from plastic, such as polycarbonate, is preferably snapped fixedly in dustproof manner into an opening 42 in the plastic component (see also FIG. 13). The lens element 41, made in one piece, is provided with resilient legs 91 provided with further elements 92 for snapping-in of these legs 91 into recesses in the injection molded part 40. The lens element 41 is further provided with a cam part 93 for radially correct positioning thereof in this injection molded part. The lens part 94 is preferably of ellipsoidal form, which further increases the precision of the apparatus according to the present invention since aberrations occurring with a spherical surface are avoided. It has further been found that, also when the light is diffused, such a form of the lens surface accurately focuses this laser light within a distance of 150–450 mm from the lens surface, which corresponds with the space directly in front of the window to a distance of about 30 cm in front of the window.

The laser source 6 provided with a sealing ring 43 is placed through an opening 44 in the component 40. Along the periphery the component 40 is provided with a separate sealing edge part 45 of rubber. The window 3 can hereby easily be cleaned and/or replaced. In addition the motor is arranged in a recess (not shown in FIG. 10) in the component 40 (see FIG. 2), while an opening 48 is also provided which, using a seal 49, enables access in optical manner via the window to electronics on the side of the board 4 facing toward the window, for instance for taking out an EPROM, in sporadically occurring cases, via removal of the window without the other components having to be disconnected. Replacing the EPROM must of course be carried out only by an expert technician, since it must be ensured at all times that the space behind the window remains free of dust.

It is noted however that the window will not have to be replaced frequently since comparatively little damage thereto will occur due to the absence of contact between window and object. In contrast to the apparatus of the prior art a single window will preferably therefore suffice. In the known apparatus of the prior art the front window had to be replaced frequently, wherein the rear window served to keep free of dust the space in which the mirror means were arranged. Although the chance of touching the window is small, the window glass is made of scratch resistant material.

FIG. 10 also shows that the board 4 is also provided on the rear side with electronic components 50, 51 and 52 whereby a single board can suffice. The board is further provided with openings 53 and 54 through which pin parts 55, 56 respectively of component 40 can be placed to position this component 40 in housing 2 independently of the printed-circuit board.

As the positioning of the laser beam from the laser source 6 is critical, see FIG. 11, the mirror 7 is precisely adjustable relative to the laser source 6 arranged on the printed-circuit board 4 using adjusting screws 61, 62 and 63 in addition to spring elements 64 and 65. In FIG. 11, the detector 71 collects the radiation reflected from the bar code and is collected by lens 41. For this purpose mirror part 8 covers only a small portion of a plate 78 which is otherwise transparent. The mirror surface 8 is preferably obtained via vapor deposition on plate 78.

The shown and described preferred embodiment of the present invention provides a great number of advantages, important ones of which are as follows:

the compact construction (145 mm×135 mm×55 mm in the disclosed embodiment) of the scanner also enables use thereof where application of scanners up until now has caused problems such as with dispensing chemists and the like, where a fixedly disposed scanner is undesirable and/or impossible or too expensive; (the other dimensions of the scanner according to the present invention can be deducted from the drawings as such dimensions are related to the overall dimension of the scanner as to be seen in the FIGS.)

this is a case of an often limited space where it is not easily possible to move the objects along the window of the scanner;

due to the mutual arrangement of the mirrors a large scanning pattern is obtained on the window and also above the window with relatively short lines, whereby when the object with bar code is moved toward the window it is virtually impossible that this will not be read by the scanner;

due to the small number of components assembly can be performed quickly, resulting in increased reliability, shorter delivery times and lower costs, in which respect it is also important that pre-vapor deposited mirrors are used as far as possible, whereby these do not have to be glued precisely;

only a single board is required for the electronics onto which the laser light source is also fixed, while the laser beam can be precisely adjusted in comparatively simple manner by means of an adjustable mirror;

due to the small number of components it is comparatively simple to keep dust-free the space in which the electronics are situated, that is, a few sealing elements are required for this purpose, while the window can easily be cleaned or replaced without dust or moisture entering the space for the mirrors; and preferably the rotatable mirrors are mounted to the motor by means of double adhesive tape, such as to further facilitate assembling of the apparatus.

The rights applied for are in no way limited to the above described preferred embodiment but are defined in the first instance by the following claims.

We claim:

1. A bar code scanning apparatus comprising:
   a) a housing provided with a window;
   b) a laser light source arranged to generate and transmit a laser beam, said laser light source being disposed in said housing;
   c) a first mirror flexibly disposed in said housing and positioned to reflect said laser beam;
   d) a rotating drive member mounted in the housing, said rotating drive member being operatively connected to a rotatable mirror;
   e) a detector arranged to receive light from said first laser beam reflected from a bar code, said laser beam having been guided to said bar code by said first mirror and said rotatable mirror via said window; and
   f) control means for manipulating said laser beam and said rotating drive member to form
      an oval, tube-like area of scan lines arranged in eight groups of triple lines in the form of an inverted U-shape so that six different angles of said scan lines are formed with respect to a selected side of said window, each said scan line being approximately ½ the length of said selected side of said window, said scan lines are diverging along a first distance of an axis extending perpendicular to said window, and converging along a second distance of said axis.

2. The apparatus as claimed in claim 1 wherein parallel lines are generated by a plurality of relatively small mirror surfaces on the rotatable member.

3. The apparatus as claimed in claim 1 wherein a plurality of parallel lines extends above the U-shape.

4. The apparatus as claimed in claim 1 further comprising a single injection molded plastic component fixable to a wall of the housing and the component separating the house into a space for the first mirror and a space for the detector.

5. The apparatus as claimed in claim 4 wherein the housing has at least one cooling hole giving access to the space for the detector.

6. The apparatus as claimed in claim 4 wherein the first mirror is fixed to the single injection molded plastic component, and wherein the component is provided with an aperture for the laser beam and an aperture for a shaft attached to the rotating driving member.

7. The apparatus as claimed in claim 4 further comprising a lens located close to the detector which can be fixedly snapped into the plastic component.

8. The apparatus as claimed in claim 7 further comprising a lens located close to the detector, the lens having a roughly ellipsoidal surface.

9. The apparatus as claimed in claim 1 wherein the rotatable mirror comprises three relatively large mirror surfaces and three relatively small mirror surfaces.

10. The apparatus as claimed in claim 1 wherein the rotatable mirror comprises vapor-deposited mirrors.

11. The apparatus as claimed in claim 1 wherein the rotatable second mirror is mounted on the rotating drive member by double adhesive tape.

12. The apparatus as claimed in claim 1 wherein the laser light source is arranged on a board having electronic components.

13. The apparatus as claimed in claim 12, wherein the board is a multi-layer board.

14. The apparatus as claimed in claim 12 further comprising a single injection molded plastic component fixable to a wall of the housing and the component separating the housing into a space for the first mirror and a space for the board having electronic components.

* * * * *